United States Patent [19]

Alexander

[11] Patent Number: 5,751,977
[45] Date of Patent: May 12, 1998

[54] WIDE SCSI BUS CONTROLLER WITH BUFFERED ACKNOWLEDGE SIGNAL

[75] Inventor: Dennis J. Alexander, Spring, Tex.

[73] Assignee: Compaq Computer Corporation, Houston, Tex.

[21] Appl. No.: 726,549

[22] Filed: Oct. 7, 1996

Related U.S. Application Data

[63] Continuation of Ser. No. 366,872, Dec. 30, 1994, abandoned.

[51] Int. Cl.$^6$ .................................................. G06F 13/00
[52] U.S. Cl. .................................. 395/306; 395/281
[58] Field of Search .............................. 395/306, 309, 395/281; 326/26, 30, 86

[56] References Cited

U.S. PATENT DOCUMENTS

| | | | |
|---|---|---|---|
| 4,604,689 | 8/1986 | Burger | 364/200 |
| 5,111,080 | 5/1992 | Mizukami et al. | 307/475 |
| 5,233,692 | 8/1993 | Gajjar et al. | 395/325 |
| 5,362,991 | 11/1994 | Samela | 327/530 |
| 5,527,996 | 6/1996 | Ham | 174/113 R |

OTHER PUBLICATIONS

*IBM Technical Disclosure Bulletin*, vol. 37 No. 10, Oct. 1994, pp. 617–618.
Data Sheet For Microlinear ML65244 Chip pp. 1, 3, 5, and 11–9 (Sep. 1994).
Small Computer System Interface–2 (SCSI–2) working draft revision 10L (Sep. 7, 1993).

*Primary Examiner*—Glenn A. Auve
*Attorney, Agent, or Firm*—Pravel, Hewitt, Kimball & Krieger

[57] ABSTRACT

SCSI controller circuitry for controlling devices on a wide SCSI bus that implement the wide SCSI bus standard according to SCSI-2 is implemented with improved circuitry for providing the wide SCSI bus acknowledge signal ACKB*. Specifically, a high speed analog buffer chip is provided that can sync and source over 55 milliamps, that has a propagation delay of 1.5 nanoseconds, and that follows its input with a high degree of accuracy. Using this circuitry, glitches are eliminated in devices with high lump capacitive loads and cross-talk on the wide SCSI bus.

32 Claims, 9 Drawing Sheets

WIDE SCSI BUS CONTROLLER WITH BUFFERED ACKNOWLEDGE SIGNAL

This is a continuation of U.S. application Ser. No. 08/366,872, filed Dec. 30, 1994, now abandoned.

BACKGROUND OF THE INVENTION

1. Field of the Invention

The invention relates to computer systems implementing a wide SCSI bus, and more specifically, to a computer system that provides improved acknowledge signal control on the wide SCSI bus.

2. Description of the Related Art

Computer systems are becoming more powerful and flexible with each passing moment. These changes are due to numerous factors, including improvements in semiconductor devices such as microprocessors and memory chips, in computer system architectures and in software capabilities.

One way flexibility is increasing, as well as performance in many instances, is by the use of Small Computer System Interface (SCSI) compatible storage devices. SCSI is a standard specification developed by the American National Standard for Information System (ANSI) and has gone through several generations. The current issued specification is SCSI-2, with SCSI-3 under development. The specification, either final or most recent published draft, for SCSI-2, which is hereby incorporated by reference, defines mechanical, electrical and functional requirements for various peripheral devices. The peripheral devices include hard disk drives, CD-ROM drives, tape units, optical drives, scanners and others as commonly used with small computers.

One advantage of SCSI is that numerous devices can be connected to a single bus and be accessed through a single controller, with only software device drivers varying between the devices. This allows easy connection of new devices. Combined with the variety of devices, SCSI thus is a very flexible system.

A second advantage of SCSI is its high performance. Thus, as it becomes more widely supported, computer system performance will increase. Because of the high performance capabilities, specialized controller integrated circuits have been developed. These chips handle many of the low level complexities of interfacing to the SCSI bus, which is the connection between the controller and the various devices. This reduction to an integrated circuit level improves performance and simplifies the software device drivers which execute on the host computer system. Recent controller chips have become quite advanced. One example is the 53C825 SCSI I/O Processor from NCR Corporation (NCR) of Dayton, Ohio. This device includes a DMA interface to allow movement of data between the SCSI devices and host computer memory without host processor intervention. This provides a large performance increase.

The 53C825 further includes the capability to communicate with both wide and narrow SCSI devices. A narrow SCSI device has an 8-bit parallel data bus, while a wide SCSI device has a 16-bit parallel data bus. A wide SCSI bus can also accommodate narrow SCSI devices by using a wide-to-narrow connecting cable. The SCSI bus can accept up to eight devices, each device having a specific ID. Because one device must be a controller, only seven SCSI devices can be connected to the controller. The connection is physically accomplished by daisy chaining the SCSI devices together with a cable. Familiarity with the NCR 53C825 SCSI I/O controller or a similar device and operations on the SCSI bus is assumed in this specification.

The SCSI standard requires the SCSI bus to be terminated to preserve signal integrity, which can be degraded by distributed capacitive loads found on the SCSI bus. The SCSI bus must be terminated at each end of the bus, but the terminators may be internal to the SCSI devices at the end of the cable. Terminators are specified by the SCSI standard to be 220 ohms to Terminal Power and 330 ohms to ground for passive termination. Active termination using a 2.85 V regulator and a 110 ohm resister is recommended for data rates of 5M byte per second and higher. Terminal Power is equivalent to 5 volt power with a backflow current prevention diode. The design for generating Terminal Power, or TERMPWR, is well known and is not discussed herein.

One problem with terminating arises when the SCSI controller is driving a SCSI bus where the controller is in the middle of the bus rather than at one end. Such is the case when the computer has an internal bus and a connector for external expansion. The internal bus is for the system hard drive and other SCSI peripherals added internally to the computer system. The external SCSI bus provides expandability so that devices external to the computer system can still communicate over the installed SCSI bus. An external SCSI connector is typically provided at the rear of the computer system. When two physically different buses are present, then the controller may find itself not at the end of the SCSI bus, but in the middle. In this case, the devices at the end of the internal and external SCSI branches are responsible for terminating the SCSI bus. However, if either the external or internal SCSI bus is not utilized, then the controller would be at the end of the bus and therefore would be required to supply a terminator.

Another further termination problem exists if the two buses are of different sizes. For example, if the internal SCSI bus is narrow and has a narrow SCSI device attached and the external SCSI bus is wide and has a wide SCSI device attached, then the controller is in the center of the bus with respect to the lower 8 data bits, but at the end of the bus with respect to the upper data bits. Thus, only the upper data bits would require termination at the controller.

The wide SCSI buses can also be configured to communicate with narrow SCSI devices by using a wide-to-narrow cable. Returning to the above example again, if the external SCSI bus is wide but has only a narrow SCSI device attached but the narrow SCSI device is connected using a wide-to-narrow cable, then the controller is in the middle and all termination will be handled by the SCSI devices since they are at the ends of the SCSI bus.

The wide SCSI bus is generally implemented using what is known as a type "B" cable, which has 68 pins. The original, narrow SCSI bus is typically implemented using what is known as a type "A" cable, which as 50 pins. The signals on each of these cables are defined within the SCSI-2 standard. On both a wide and a narrow SCSI bus, SCSI signals are either differential or are single-ended depending on the types of cable and termination used.

Disk drives are typically implemented as SCSI devices. For higher data rates, they often implement the SCSI-2 standard for wide SCSI bus data transfers, using a type B cable and transferring 16 bits at one time. During testing of such disk drives on the wide SCSI bus, a signal integrity problem was noticed on the ACK* line when using such disk drives on 3' to 12' cables. This occurred even though the disk drives conformed to the SCSI-2 standard regarding capacitive and resistive loading, as well as termination, and even though the cable lengths did not exceed the maximum. This signal integrity problem pertained to request/acknowledge handshaking with the disk drives over the wide SCSI bus. The SCSI-2 standard provides for two signals for request/ acknowledge handshaking.

On the SCSI bus, these signals are the request signal REQ* and the acknowledge signal ACK*. Note that in this specification, an asterisk (*) following a signal indicates that the signal is active low, in that a low physical voltage corresponds to a true state for that signal.

This ACK* signal integrity problem appears to be related to capacitive loading and cross-talk problems presented by disk drives attached to the wide SCSI bus. A "ringing" was noticed on the ACK* signal that had a detrimental effect on performance, causing data errors.

Because these errors affect performance, it would therefore be desirable to reliably and inexpensively eliminate the signal integrity problem in the ACK* signal on the wide SCSI bus.

SUMMARY OF THE INVENTION

In SCSI controller circuitry implemented according to the invention, the signal integrity problem when using devices connected using the wide SCSI bus standard is resolved by using a fast buffer chip to provide a buffered form of ACK*.

More specifically, an analog high speed buffer is preferably used to track the standard ACK* signal generated by a standard wide SCSI bus controller and to provide this buffered signal to the devices on the wide SCSI bus. Further, the buffer preferably has a propagation delay of less than 1.5 nanoseconds and is capable of sinking and sourcing over 55 milliamps.

Further, the analog high speed buffer is preferably placed near the device which is using the SCSI signal. In the distributed SCSI system in which a number of disk drives are provided on SCSI stubs at the end of a 12' cable, this buffer is preferably placed at the end of the SCSI cable near the disk drive, rather than driving the SCSI cable itself.

BRIEF DESCRIPTION OF THE DRAWINGS

A better understanding of the present invention can be obtained when the following detailed description of the preferred embodiment is considered in conjunction with the following drawings, in which.

DETAILED DESCRIPTION OF THE PREFERRED EMBODIMENT

Figure 1:
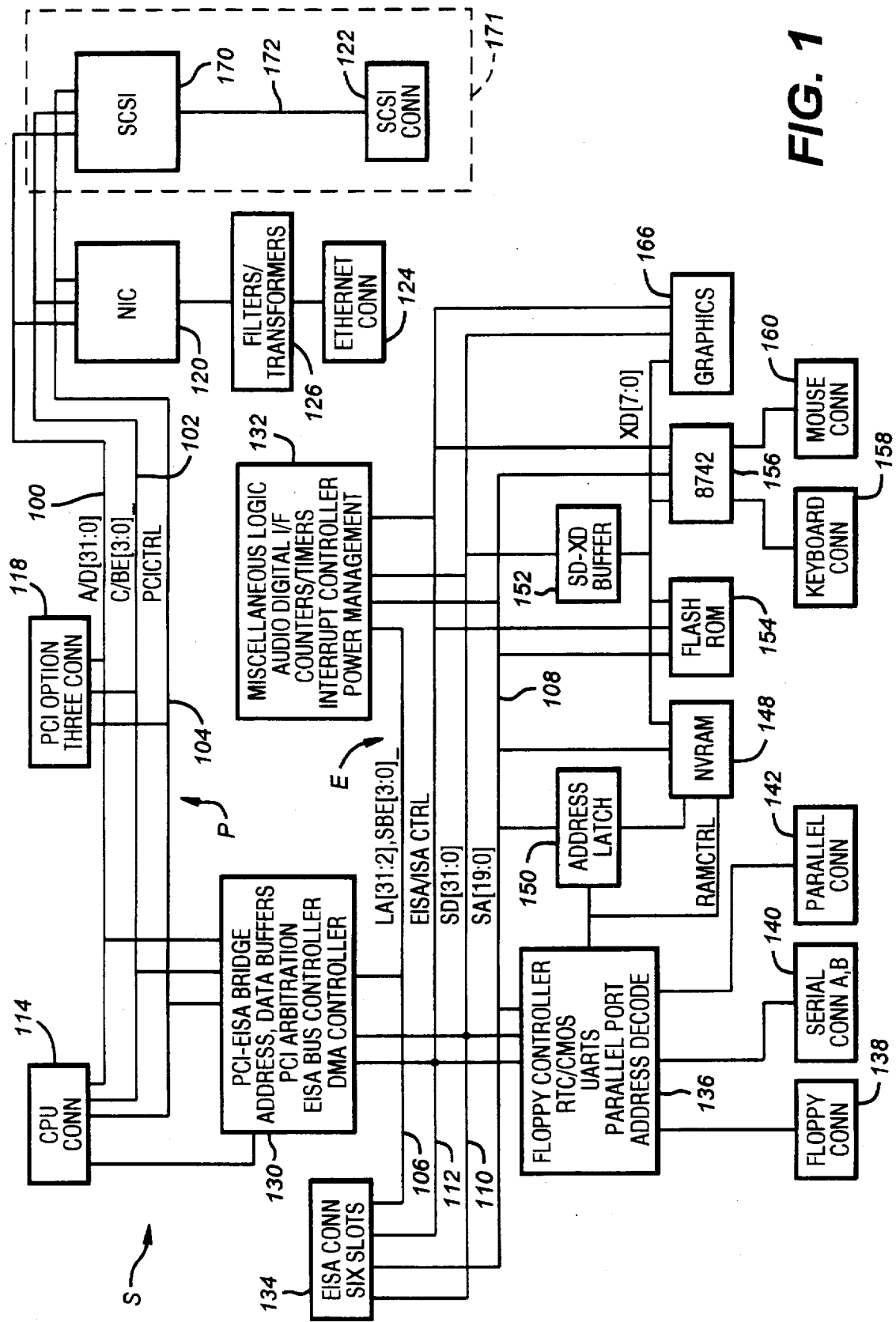
FIG. 1 is a block diagram illustrating a computer system board containing a SCSI system designed according to the present invention.

Referring now to FIG. 1, the system board S of a computer system for use according to the present invention is shown. In the preferred embodiment, the system boards contain circuitry and slots for receiving interchangeable circuit boards. In the preferred embodiment, there are two primary buses located on the system board S. The first bus is the PCI or Peripheral Component Interconnect bus P which includes address/data portion 100, control and byte enable portion 102 and control signal portion 104. The second primary bus on the system board S is the EISA bus E. The EISA bus E includes LA address portion 106, SA address portion 108, SD data portion 110 and EISA/ISA control signal portion 112. The PCI and EISA buses P and E form the backbones of the system board S.

Figure 2:
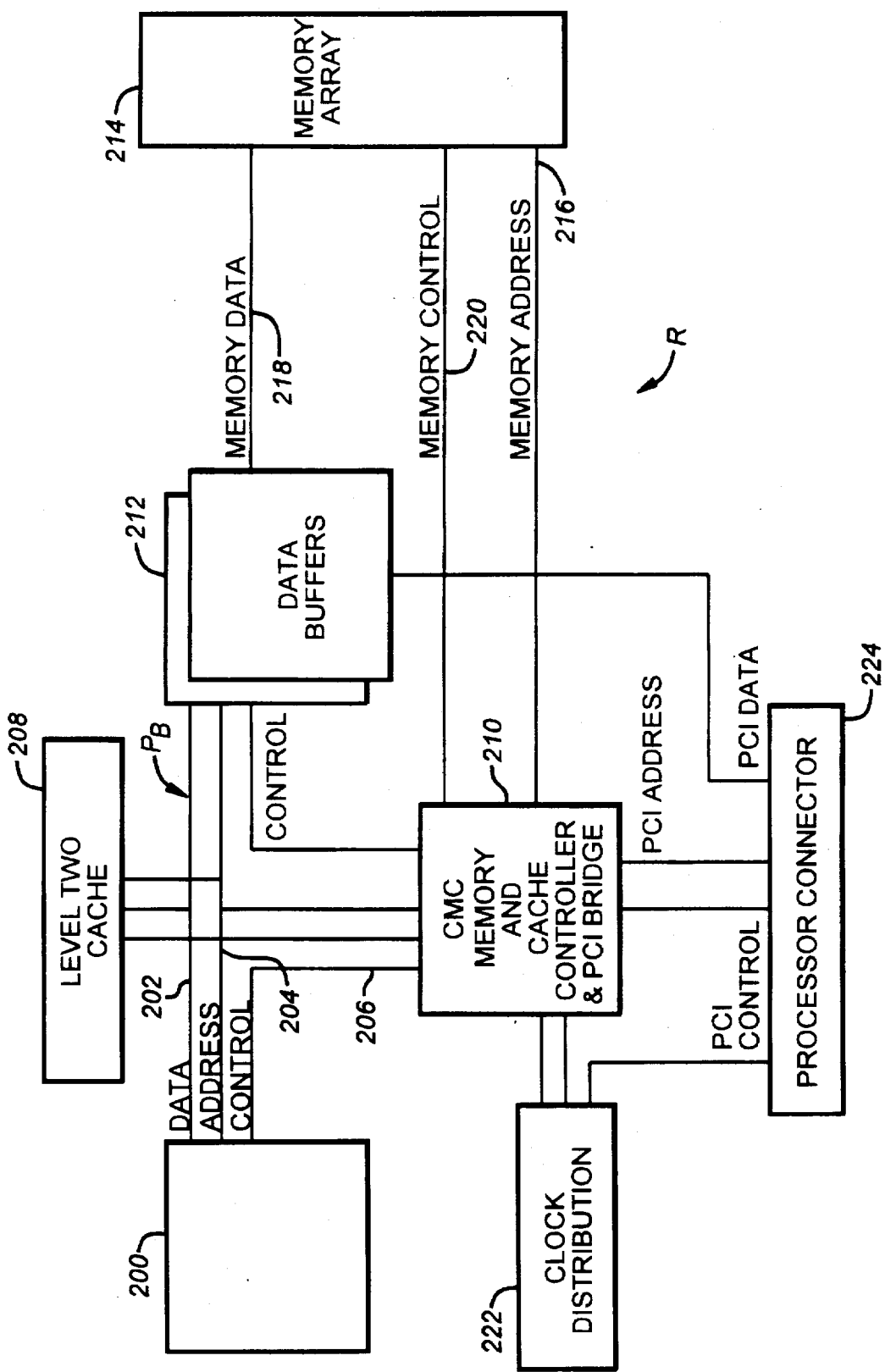
FIG. 2 is a block diagram illustrating a CPU board designed to be used with the computer system board of FIG. 1.
Figure 3:
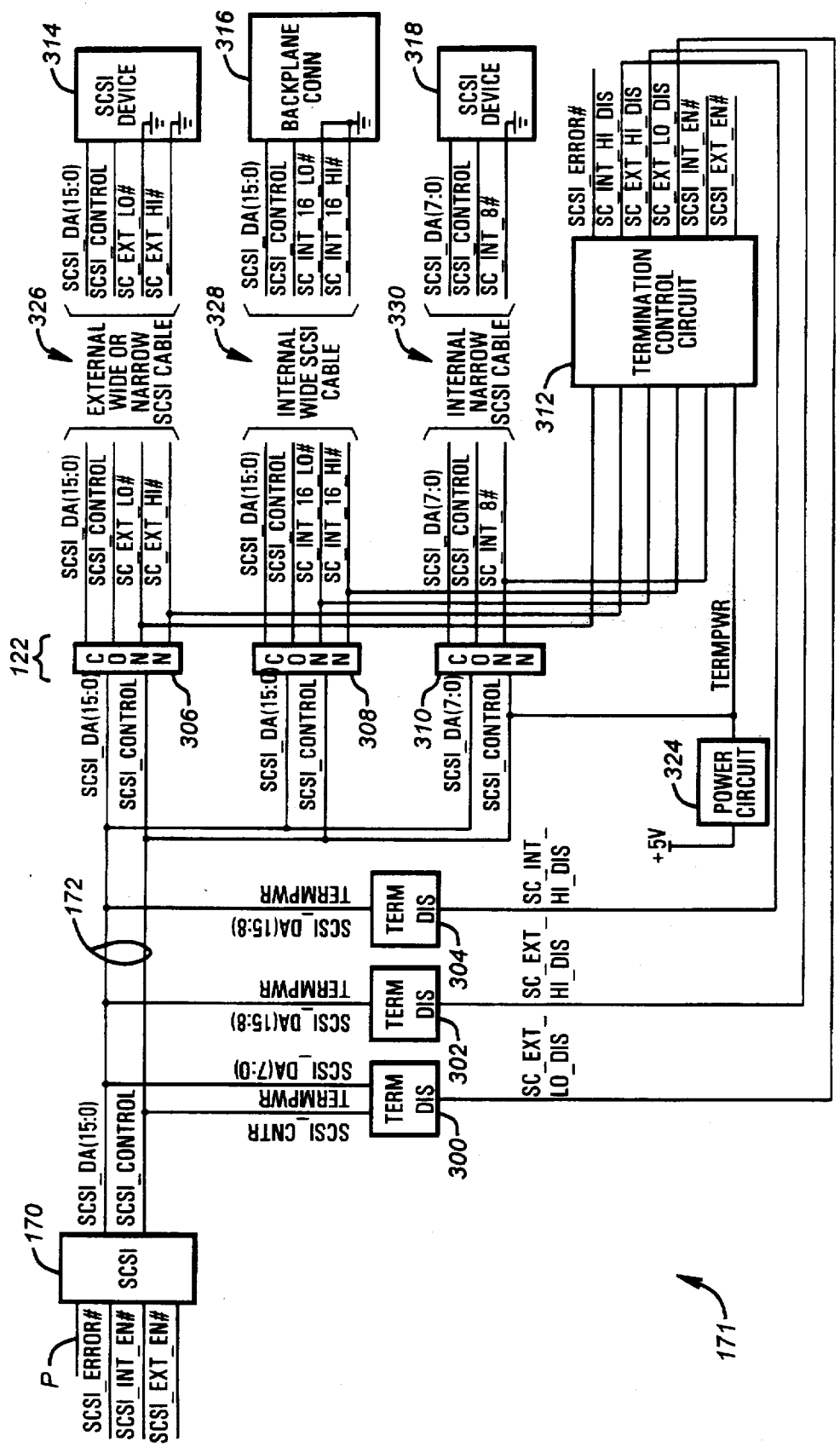
FIG. 3 shows a simplified block diagram of the SCSI system designed according to the invention.

A CPU connector 114 is connected to the PCI bus P to receive interchangeable processor cards, such as the one shown in FIG. 2. A series of three PCI option connectors 118 are also connected to the PCI bus P to receive any additional cards designed according to the PCI standard. A SCSI controller 170 contained in a SCSI subsystem 171, which is shown in more detail in FIG. 3, is connected to the PCI bus P to communicate with SCSI standard devices, such as hard drives, CD-ROMs and tape drives (not shown). Preferably the SCSI controller 170 is an 53C825 manufactured by National Cash Register. The SCSI controller 170 includes the capabilities necessary to act as a PCI bus master and slave and provide a SCSI bus 172. The SCSI devices communicate over the SCSI bus 172 through the SCSI connectors 122 provided on the system board S. In addition, a network interface (NIC) controller 120 is connected to the PCI bus P. Preferably the controller 120 includes the capabilities necessary to act as a PCI bus master and slave and the circuitry to act as an Ethernet interface. An Ethernet connector 124 is provided on the system board S and is connected to filter and transformer circuitry 126, which in turn is connected to the controller 120. This forms a network or Ethernet connection for connecting the system boards and computer to a local area network (LAN).

A PCI-EISA bridge 130 is provided to convert signals between the PCI bus P and the EISA bus E. The PCI-EISA bridge 130 includes the necessary address and data buffers and latches, arbitration and bus master control logic for the PCI bus, EISA arbitration circuitry, and EISA bus controller as conventionally used in EISA systems and a DMA controller. Preferably the PCI-EISA bridge 130 is a single integrated circuit, but other combinations are possible. A miscellaneous system logic chip 132 is connected to the EISA bus E. The miscellaneous system logic chip 132 contains counters and timers as conventionally present in personal computer systems, an interrupt controller for both the PCI and EISA buses P and E and power management logic, as well as other miscellaneous circuitry.

A series of six EISA slots 134 are connected to the EISA bus E to receive ISA and EISA adapter cards. A combination I/O chip 136 is connected to the EISA bus E. The combination I/O chip 136 preferably includes a floppy disk controller, real time clock (RTC)/CMOS memory, two UARTs, a parallel port and various address decode logic. A floppy disk connector 138 for receiving a cable to a floppy disk drive is connected to the combination I/O chip 136. A pair of serial port connectors are also connected to the combination I/O chip 136, as is a parallel port connector 142. A non-volatile random access memory (NVRAM) 148 is connected to the EISA bus E and receives its control signals from the combination I/O chip 136. An address latch 150 is connected to the EISA bus E and controlled by the combination I/O chip 136 to provide additional addressing capability for the NVRAM 148. Preferably the NVRAM 148 is used to contain certain system information.

A data buffer 152 is connected to the SD portion of the EISA bus E to provide an additional data bus XD for various additional components of the computer system. The NVRAM 148 is connected to the XD data bus to receive its data bits. A flash ROM 154 receives its control and address signals from the EISA bus E and is connected to the XD bus for data transfer. Preferably the flash ROM 154 contains the BIOS information for the computer system and can be reprogrammed to allow for revisions of the BIOS. An 8742 or keyboard controller 156 is connected to the XD bus and EISA address and control portions 108 and 112. The keyboard controller 156 is of conventional design and is connected in turn to a keyboard connector 158 and a mouse or pointing device connector 160. A graphics controller 166 receives its control and address from the EISA bus E and is connected to the XD bus for data transfer. The graphics controller 166 provides video graphics to a monitor (not shown) for user interaction.

Referring now to FIG. 2, the processor board P is shown. In the processor board P of FIG. 2, the CPU or processor 200 can be any of a plurality of processors, such as the 486DX/33, 486DX2/66, 486DX4/50–100, 486DX4/33–100, 486DX4/33–83, P24T, P54C/M, Pentium 50/75, Pentium 60/90, and Pentium 66/100, and other similar and compatible processors. The processor 200 provides data, address and control portions 202, 204 and 206 to form a processor bus PB. A level 2 (L2) or external cache memory system 208 is connected to the processor bus PB to provide additional caching capabilities to improve performance of the computer system. The L2 cache 208 can be organized as a 128 kbyte direct mapped cache or 256 kbyte two-way set associative cache when used with 486 family processor and as a 256 or 512 kbyte direct mapped or two-way set associative cache when used with Pentium family processors. A cache and memory controller (CMC) and PCI bridge chip 210, is connected to the control portion 206 and to the address portion 204. The CMC 210 is connected to the L2 cache 208 as it incorporates the cache controller and therefore controls the operations of the cache memory devices in the L2 cache 208. The CMC 210 is also connected to control a series of address and data buffers 212. The data buffers 212 are utilized to handle memory data to a main memory array 214. The data buffers 212 are connected to the processor data portion 202 and receive control signals from the CMC 210. The data buffers 212 provide a memory address bus 216 and a memory data bus 218 to the memory array 214. A memory control signal bus 220 and memory address bus 216 is provided from the CMC 210. Clock distribution and generation circuitry 222 is associated with the processor card P and is connected to the CMC 210. A processor connector 224, such as a card edge, is provided to be mateably received by the processor connector 114. The processor connector 224 is connected to the CMC 210, the data buffers 212 and the clock distribution circuitry 222 to provide clocks to the computer system and to provide a PCI interface to allow the processor 200 to access the PCI and EISA buses P and E and to allow PCI and EISA bus masters to access the main memory array 214.

The computer system elements that are not discussed in detail below are not significant to the present invention other than to illustrate an example of a fully figured computer system. It is noted that the above description of a computer system is provided for completeness and numerous variations could be developed as is apparent to those skilled in the art.

Referring now to FIG. 3, the SCSI controller 170 is shown connected to the PCI bus P and the SCSI bus 172. The preferred 53C825 SCSI controller has the capability of communicating with both wide and narrow SCSI devices on the SCSI bus 172. As defined by the American National Standards Institute (ANSI), the SCSI standard was extended and now a SCSI-2 standard provides for several types of data transfers. Narrow SCSI refers to the conventional 8-bit SCSI devices. Wide SCSI refers to SCSI devices having 16 data bits. Still further, fast SCSI refers to transfers that exceed the conventional SCSI standard transfer rate by allowing data transfers over the SCSI bus at up to 10 Mbyte/sec for fast-narrow SCSI and 20 Mbyte/sec for fast-wide SCSI. The 53C825 supports all of these different types of transfers.

The SCSI bus 172 includes control signals SCSI_CONTROL. Among these are ACK*. The buffering of these signals according to the invention is further described in the discussion of FIG. 8 below.

The SCSI bus 172 is connected to the SCSI connectors 122 for communicating with SCSI devices. More specifically, the SCSI bus 172 is connected to an external 16-bit connector 306, an internal 16-bit connector 308 and an internal 8-bit connector 310. The 16-bit connectors 306 and 308 are 68-pin SCSI connectors. The internal 8-bit connector is a 50 pin SCSI connector. Thus the SCSI bus 172 has three possible branches. Each branch will be discussed more fully below.

Each of these connectors 306, 308 and 310 receives a cable for coupling to the SCSI devices. As per the SCSI standard, each SCSI device is daisy-chained. So, the first SCSI device is cabled to a connector, with the next SCSI device being cabled to the first SCSI device, and so on. The SCSI controller 170 can communicate with up to seven SCSI devices spread over the branches of the SCSI bus 172.

The external 16-bit connector 306 provides optional expansion. The external 16-bit connector 306 receives a SCSI cable 326 if coupling to an optional SCSI device 314. It is noted that the SCSI device 314 is shown singularly, but up to seven devices can connect to the SCSI controller 170. As an example, a disk drive (not shown) would typically be connected to the connector 306.

An internal SCSI device must be utilized, so either the internal 16-bit connector 308 or the internal 8-bit connector 310 must be coupled to a SCSI device. Only one of the two may be used. The internal 16-bit connector 308 may receive a SCSI cable 328 and the internal 8-bit connector 310 may receive a SCSI cable 330 for coupling to a backplane connector 316 and SCSI device 318 respectively. It is noted that the SCSI device 318 is shown singularly, however, up to seven devices can connect to the SCSI controller 170.

As mentioned, the computer system has two mutually exclusive configurations for supporting internal SCSI devices. One alternative is to connect the internal SCSI devices through connector 310, in which case connector 308 cannot be used. This configuration only supports narrow SCSI devices. The other alternative is to connect the internal SCSI devices through a connector 308 which couples to a backplane connector 316.

Figure 5:
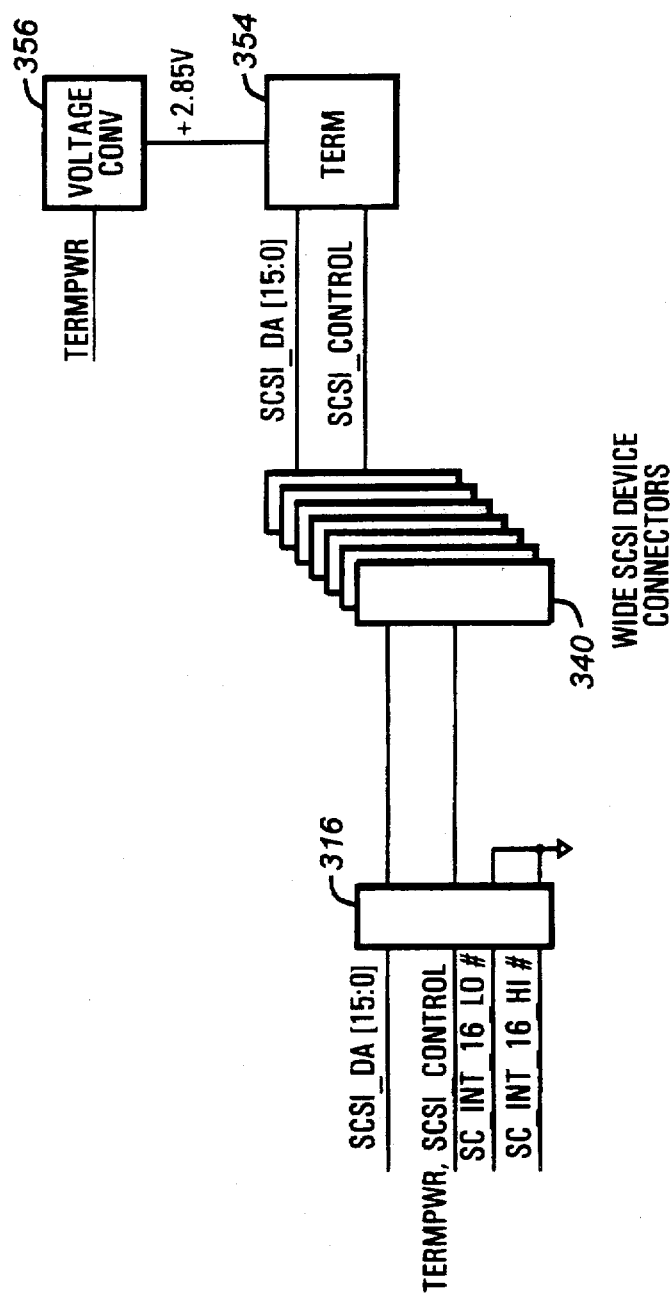
FIG. 5 shows a simplified block diagram of one form of backplane including terminators.
Figure 6:
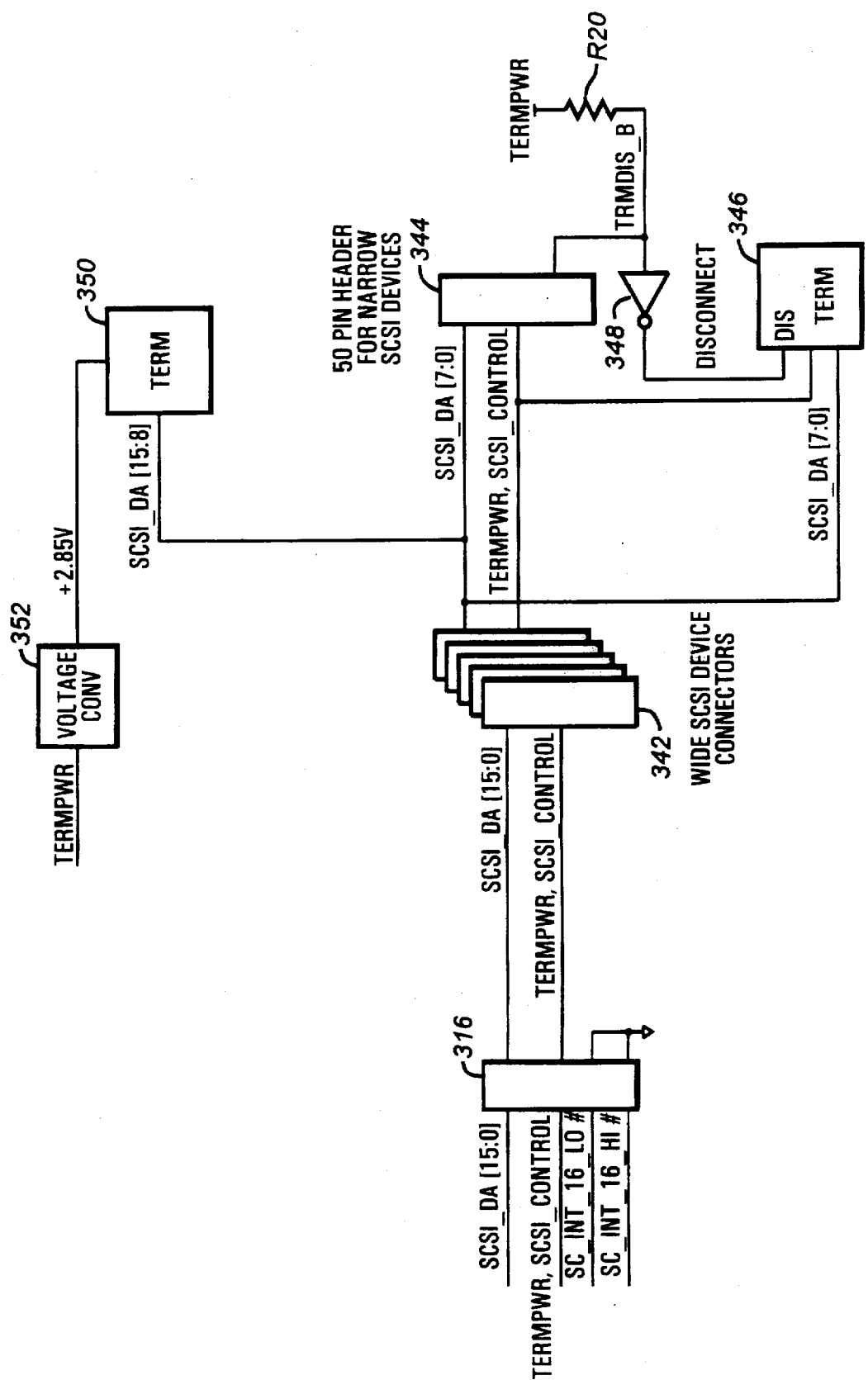
FIG. 6 shows a simplified block diagram of an alternative form of backplane including terminators.

Two forms of the backplane are supported. One form supports up to seven wide SCSI devices by providing seven wide SCSI connectors 340, as illustrated in FIG. 5, while the other supports up to five wide and two narrow SCSI devices as illustrated in FIG. 6 by use of five wide SCSI connectors 342 and a narrow SCSI header 344 which may receive a narrow SCSI cable. FIGS. 5 and 6 will be described in more detail below. The 16-bit connector 306 is capable of receiving a wide or wide-to-narrow SCSI cable 326, the wide cable transferring 16-bits of data in parallel while the wide-to-narrow cable transfers 8-bits in parallel.

Alternatively, the backplanes could be installed in a separate external chassis and connected to the external connector 306.

The SCSI standard also defines the pinout for the SCSI connectors and cables. To keep noise minimal, multiple ground pins and signals are defined for interleaving between the SCSI signals in the cable and at the connectors. In the present invention, all of the pins defined as ground pins are not connected to ground at connectors 306, 308 and 310 as conventionally performed. At SCSI device 318 and backplane connector 316 the pins defined as ground pins are connected to ground as conventionally defined by SCSI standard.

Figure 4:
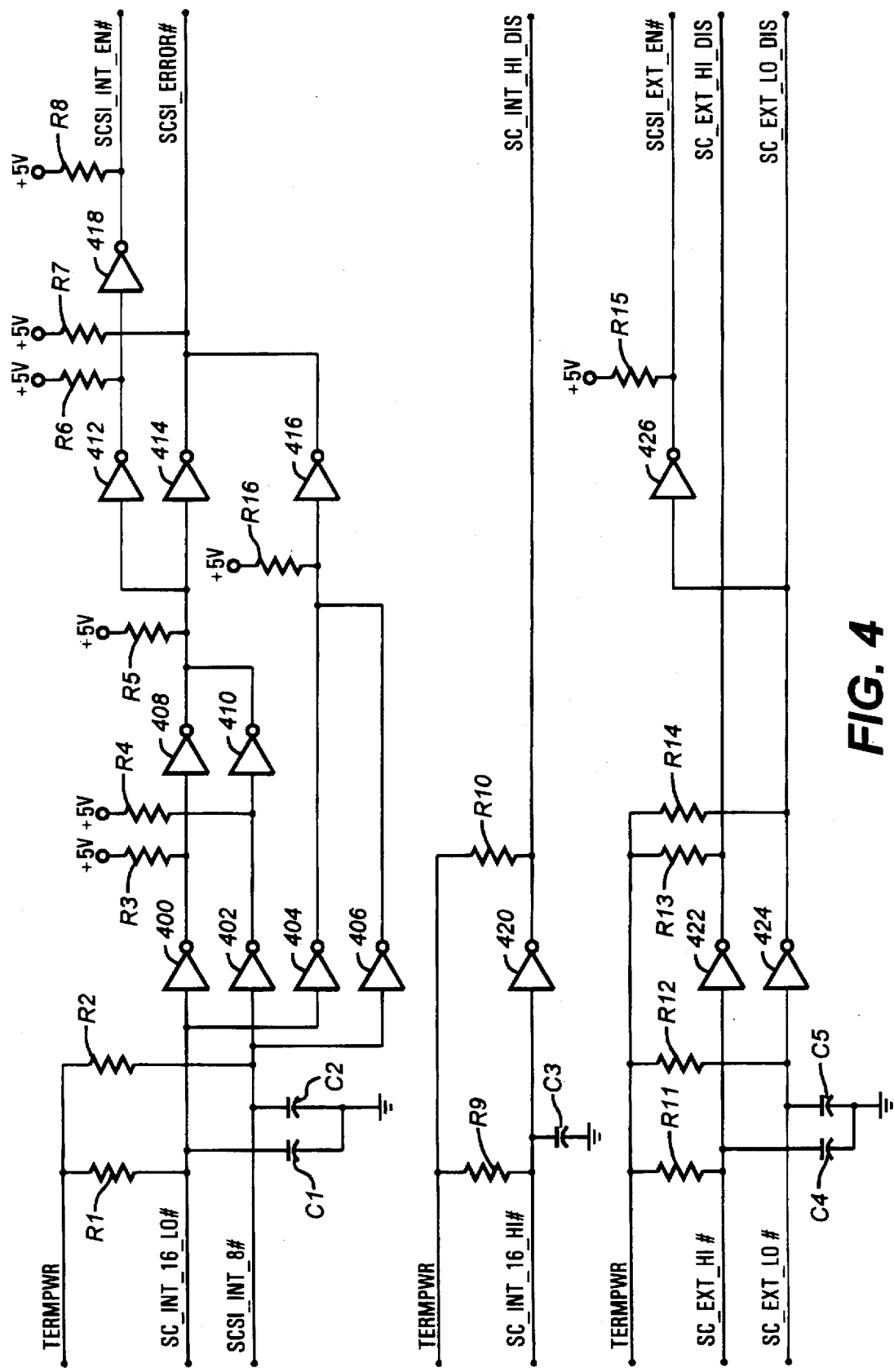
FIG. 4 shows a detailed schematic drawing of the SCSI termination control circuitry according to the invention.

So, at the 16-bit connectors 306 and 308, pins 1 and 50 are not grounded but instead are connected to a termination control circuit 312 shown in detail in FIG. 4. It is noted that other typical ground pins could be used. At connector 306, pin 50 is connected to a pull-up resistor R12 in the termination control circuit 312, discussed below, by a SCSI cable external low signal, termed SC_EXT_LO#, and pin 1 is connected to a pull-up resistor R11 in the termination control circuit 312, discussed below, by a SCSI cable external high signal, termed SC_EXT_HI#. If a wide cable 326 is coupled between connector 306 and the SCSI device 314 to allow communication with wide SCSI devices, the SC_EXT_LO# and SC_EXT_HI# signals will be pulled low by the grounded pins of SCSI device 314. A wide SCSI device will make contact with both signals. If a wide-to-narrow cable 326 is coupled between connector 306 and the SCSI device 314 to allow communication with narrow SCSI devices, the SC_EXT_LO# signal will be pulled low by the grounded pin of the narrow SCSI device, but the SC_EXT_HI# signal will remain high since the narrow SCSI device does not make contact with this signal. A narrow SCSI device connects only with the SC_EXT_LO# signal. If a cable is not connected, then both the SC_EXT_LO# and SC_EXT_HI# signals will remain high. Thus, the termination control circuit 312 can detect the presence, or lack of presence, of either a wide or narrow SCSI configuration coupled to external 16-bit connector 306.

Similarly, internal 16-bit connector 308 has a pin 50 connected to a pull-up resistor R1 in the termination control circuit 312, discussed below, by a SCSI cable internal 16 low signal, termed SC_INT_16_LO#, and pin 1 is connected to a pull-up resistor R9 in the termination control circuit 312, discussed below, by a SCSI cable internal 16 high signal, termed SC_INT_16_HI#. If the backplane configuration is selected and a cable 328 is coupling backplane connector 316 to internal 16-bit connector 308, then the SC_INT_16_LO# and SC_INT_16_HI# signals will be pulled low by the grounded pins of backplane connector 316. In an alternate embodiment not shown, if the backplane only includes narrow devices then the SC_INT_16_LO# signal could be pulled low by a grounded pin of the backplane connector 316, but the SC_INT_16_HI# signal would remain high. Thus, the termination control circuit 312 could detect the presence, or lack of presence, of either a wide or narrow SCSI configuration coupled to the internal 16-bit connector 308 in that case.

The internal 8-bit connector 310, being a 50-pin SCSI connector, has a pin 22 not connected to ground as conventionally performed, but instead connected to a pull-up resistor R2 in the termination control circuit 312, discussed below, by a SCSI internal 8 signal, termed SCSI_INT_8#. If a SCSI cable 330 is coupled between connector 310 and the SCSI device 318, the SCSI_INT_8# signal will be pulled low by the corresponding grounded pin of SCSI device 318. If the internal 8-bit connector 310 is not used, then the SCSI_INT_8# signal will remain high. Thus, the termination control circuit 312 can detect the presence, or lack or presence, of a narrow SCSI device coupled to internal 8-bit connector 310.

A power circuit 324 generates a Terminal Power signal, called TERMPWR, by connecting a current backflow diode to system power line. This is a well known circuit to provide the TERMPWR signal for the SCSI bus 172 and the terminators.

Referring now to FIG. 4, the termination control circuit 312 is shown in more detail. The TERMPWR signal is shown connected to one end of resistors R1, R2, R9, R10, R11, R12, R13 and R14. Resistors R3, R4, R5, R6, R7, R8, R15 and R16 are connected to system power at one end. A SCSI internal enable signal, termed SCSI_INT_EN#, is connected to the output of an open collector inverter 418 and the second end of the resistor R8. The output of an open collector inverter 412 is connected to the input of inverter 418 and the second end of resistor R6. The input of inverter 412 is connected to the input of an open collector inverter 414, the output of open collector inverter 408, the output of open collector inverter 410 and the second end of resistor R5. The input of inverter 408 is connected to the output of open collector inverter 400 and the second end of resistor R3. The input to open collector inverter 400 is connected to the SC_INT_16_LO# signal, the input to open collector inverter 404, the second end of resistor R1 and one end of a capacitor C1, whose other end is connected to ground. The input of open collector inverter 410 is connected to the output of open collector inverter 402 and the second end of resistor R4. The input of inverter 402 is connected to a SCSI_INT_8# signal, the input of open collector inverter 406, the second end of resistor R2 and one end of capacitor C2, whose other end is connected to ground. Thus if either the SC_INT_16—LO# signal or the SCSI_INT_8# signal is driven low, the SCSI_INT_EN signal will be driven low or active.

A SCSI error signal, termed SCSI_ERROR#, is connected to the outputs of open collector inserters 414 and 416 and the second end of resistor R7. The input to inverter 416 is connected to the outputs of open collector inserters 404 and 406 and the second end of resistor R16. Thus, if neither signals SC_INT_16_LO# or SCSI_INT_8# are driven low then the SCSI_ERROR# signal will be driven low, indicating an error because there are no SCSI devices connected to either the internal wide SCSI bus or internal narrow SCSI bus. In a computer system according to the present invention, an internal SCSI device or a cable with a terminator is assumed to be present on either the internal wide SCSI bus or internal narrow SCSI bus. The SCSI_ERROR# signal indicates when this condition is not true. If both the SC_INT_16_LO# and SCSI_INT_8# signals are driven low, then the SCSI_ERROR# signal will also be driven low, indicating an error because both internal buses are used, which is an impermissible configuration.

A SCSI cable internal high disabled signal, termed SC_INT_HI_DIS, is connected to the output of an open collector inverter 420 and the second end of resistor R10.

The input of inverter 420 is connected to the SCSI cable internal 16 high signal SC_INT_16_HI#, the second end of resistor R9 and one end of capacitor C3, whose other end is connected to ground. Thus, if a wide SCSI cable 328 is coupled to the internal 16 bit connector 308 the SC_INT_16_HI# signal will be driven low and the SC_INT_HI_DIS signal will be driven high.

A SCSI external enable signal, termed SCSI_EXT_EN#, is connected to the output of an open collector inverter 426 and the second end of resistor R15. A SCSI cable external low disable signal, termed SC_EXT_LO_DIS, is connected to the input of inverter 426, the output of an open collector inverter 424 and the second end of resistor R14. The SCSI cable external low SC_EXT_LO# signal, is connected to the input of inverter 424, one end of resistor R12 and the second end of capacitor C5, whose other end is connected to ground. Thus, when the SC_EXT_LO# signal is driven low, the SC_EXT_LO_DIS signal will be driven high and the SCSI_EXT_EN# signal will be driven low.

A SCSI cable external high disable signal, termed SC_EXT_HI_DIS, is connected to the output of open collector inverter 422 and the second end of resistor R13. The SCSI cable external high signal SC_EXT_HI#, is connected to the input of inverter 422, the second end of resistor R11 and one end of capacitor C4, whose other end is connected to ground. Thus, when the SC_EXT_HI# signal is driven low, the SC_EXT_HI_DIS signal will be driven high.

Referring back to FIG. 3, the block diagram illustrates the connection between the termination control circuit 312 and terminators 300, 302 and 304. The terminators provide active termination of the SCSI bus 172 signal lines and have the capability to disconnect, thereby removing termination if desired. Preferably, the terminators are a UC5601/03 manufactured by Unitrode Integrated Circuits.

The termination control circuit 312 provides the SC_EXT_LO_DIS signal to a disable input of terminator 300. Terminator 300 is preferably a UC5601 compatible terminator which provides termination for all required control lines and the low 8 data lines of SCSI bus 172. Alternatively, in place of a single UC5601 two separate UC5603 terminators could be used, as each UC5603 provides only 9 terminators and therefore two would be required to replace one UC5601.

Figure 7:
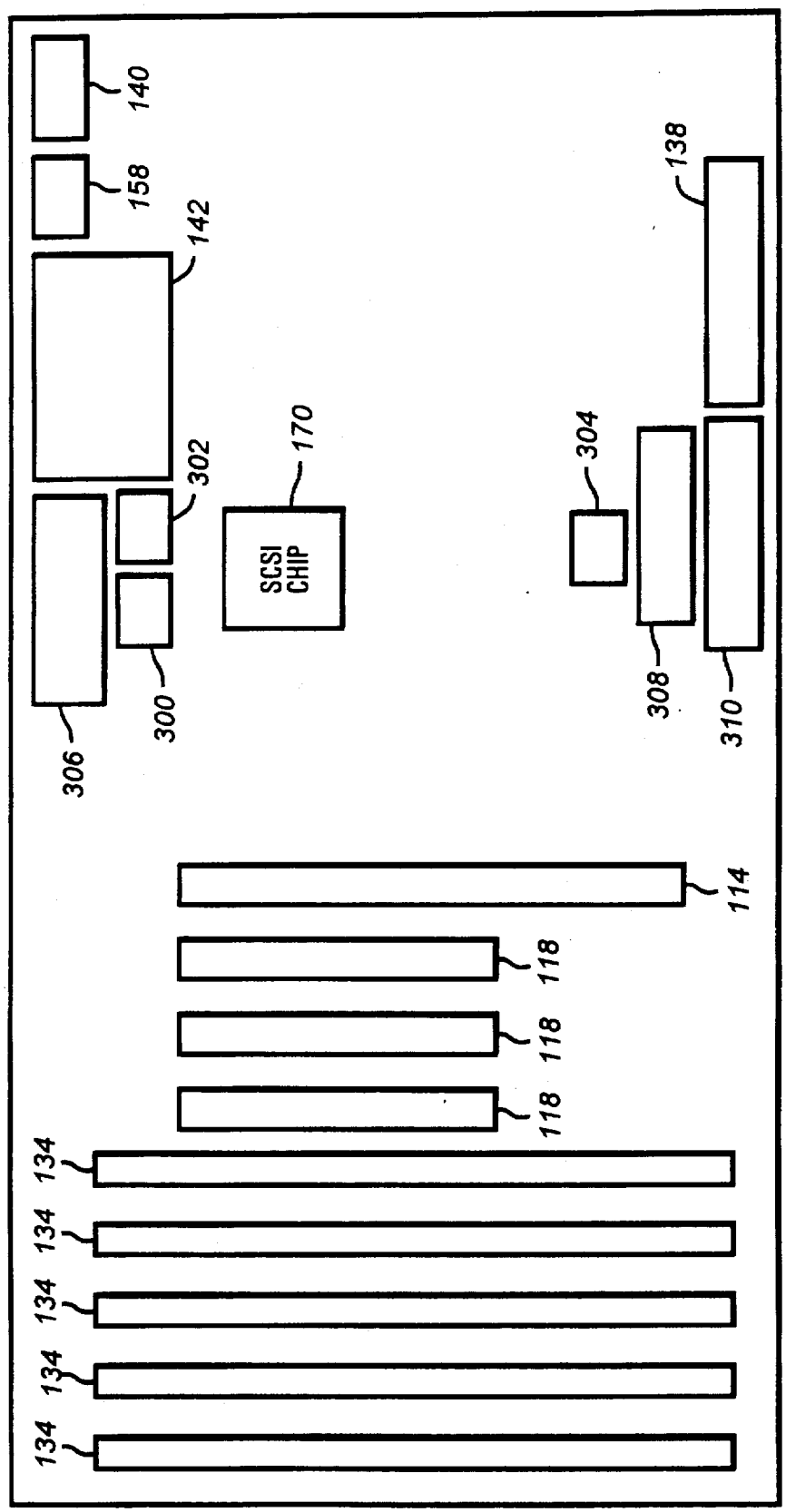
FIG. 7 is a simplified drawing showing the location of the SCSI terminators and connectors of the system board of FIG. 1.

The termination control circuit 312 provides the SC_EXT_HI_DIS signal to the disable input of a terminator 302. The terminator 302 terminates the high 8 data lines when enabled. The SC_INT_HI_DIS signal, provided by termination control circuit 312, connects to the disable input of a terminator 304 which is preferably compatible with UC5603. The terminator 304 terminates the high 8 data lines when enabled. The general locations of the connectors 306, 308 and 310, the SCSI controller 170 and the terminators 300, 302, 304 on the computer system board are shown in FIG. 7. As can be seen, terminators 302 and 304 are both necessary as the distance between the internal and external connectors greater than an acceptable distance from a termination point. Therefore the two terminators 302 and 304 are utilized.

The SCSI controller 170 receives the SCSI_INT_EN# and SCSI_EXT_EN# signals from the termination control circuit 312. The signals are connected to a pair of general purpose interface inputs for allowing the SCSI controller 170 and the computer system generally to detect the presence of external or internal SCSI devices. The SCSI_ERROR# signal is also connected to a general purpose interface input of SCSI controller 170 for detecting the lack of an internal SCSI device.

Referring again to FIG. 5, the seven wide SCSI backplane form is shown with a terminator 354. The backplane connector 316 receives the SCSI_DA(15:0), SCSI_CONTROL, TERMPWR, SC_INT_16—LO# and SC_INT_16_HI# signals. As previously described, the SC_INT_16_LO# and SC_INT_16_HI# signals are grounded at the backplane connector 316. Seven wide SCSI connectors 340 are connected to the SCSI backplane connector 316 for engaging up to seven wide SCSI devices (not shown). After the last wide SCSI connector 340, a terminator 354 receives the SCSI_DA(15:0) and SCSI_CONTROL signals from the last wide SCSI connector 340 for terminating these signals. The signals are each terminated to +2.85 volts through an individual 110 ohm resistor (not shown). A voltage converter 356 receives the TERMPWR signal for providing the converted +2.85 volt signal to terminator 354. Thus, for the seven wide SCSI backplane configuration, the SCSI_DA(15:0) and SCSI_CONTROL signals are always terminated since these terminators are at the end of the SCSI bus.

Referring again to FIG. 6, the five wide/two narrow SCSI backplane form is shown with a terminator 346. The backplane connector 316 receives the SCSI_D(15:0), SCSI_CONTROL, TERMPWR, SC_INT_16_LO# and SC_INT_16_HI# signals. Five wide SCSI connectors 342 are connected to the SCSI backplane connector 316 for engaging up to five wide SCSI devices (not shown). A 50 pin header 344 is connected to the last wide SCSI connector 342 for coupling to up to two narrow SCSI devices (not shown). Only the lower eight data bits SCSI_DA(7:0) are connected to the 50 pin header 344.

A TRMDIS_B signal is connected to a pin of the 50 pin header 344, the input of an inverting means 348 and one end of a resistor R20 whose second end is connected to TERMPWR. The output of the inverting means 348 provides a DISCONNECT signal to the disable input of a terminator 346. The terminator 346 also receives the SCSI_DA(7:0) and SCSI_CONTROL signals at its terminator inputs. Thus, if a narrow SCSI device is coupled to the 50 pin header 344 the TRMDIS_B signal will be pulled low which will cause the DISCONNECT signal to be driven high and the terminator 346 to be disabled. If a narrow SCSI device is not coupled, the DISCONNECT signal will remain low and the terminator 344 enabled.

A terminator 350 is connected to the SCSI_DA(15:8) signals for always terminating these signals. Terminator 350 terminates each signal to +2.85 volts through an individual 110 ohm resistor (not shown). A voltage converter 352 receives the TERMPWR signal for providing the converted +2.85 volt signal to terminator 350.

Figure 8:
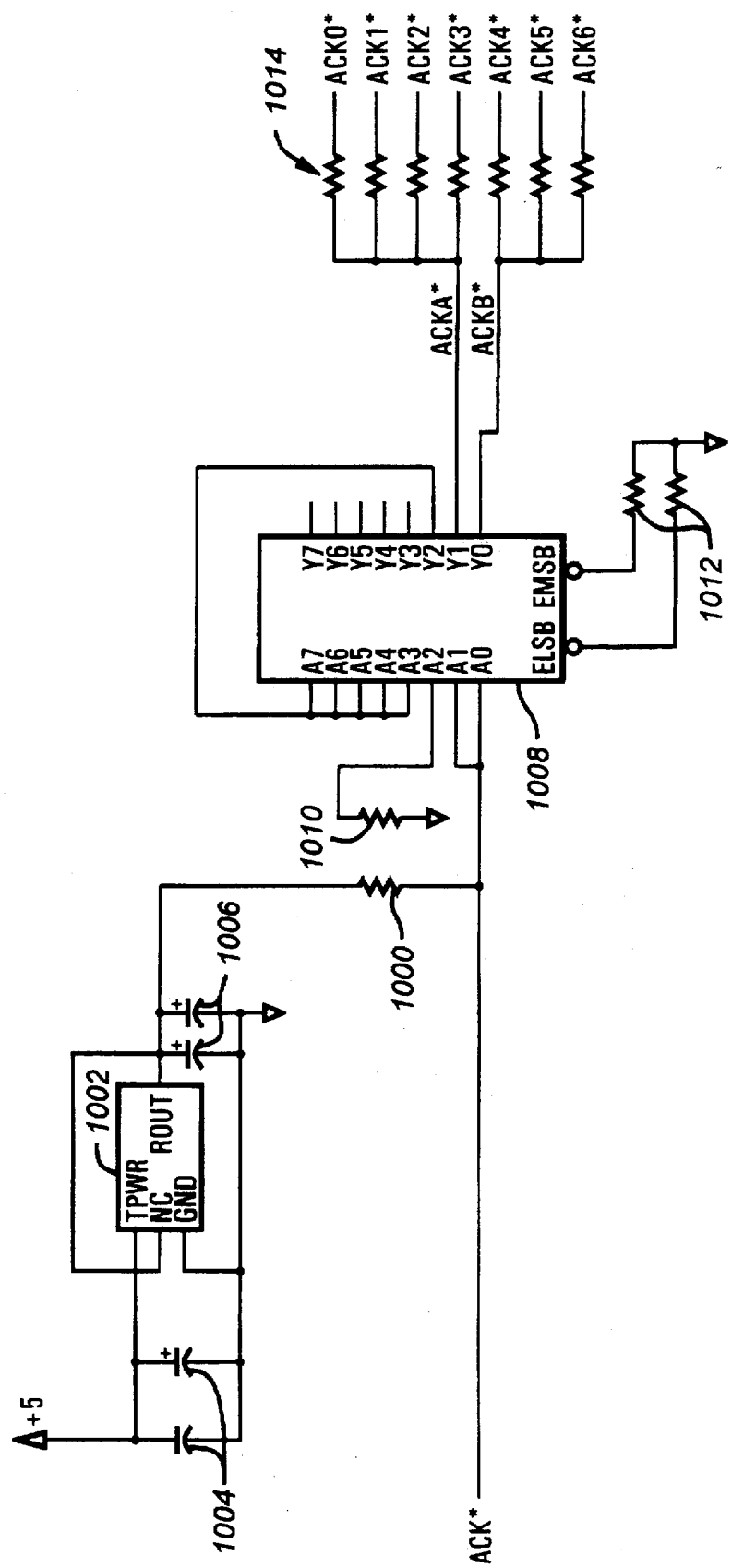
FIG. 8 is a schematic illustration of circuitry providing the buffered ACK* signal on the SCSI bus according to the invention.

Referring to FIG. 8, details of the circuitry used to provide the buffered SCSI acknowledge signals according to the invention is shown. Note that this circuitry provides buffered acknowledge signals ACKA* and ACKB* from ACK* as a source. As previously described in the background, ACK* is a signal driven by the SCSI controller 170, and provided to a SCSI bus to indicate an acknowledgment for request/acknowledge data transfer handshake.

Referring to FIG. 8, standard wide SCSI bus initiator circuitry within the SCSI controller 170 provides ACK* as one of the SCSI control signals SCSI_CONTROL according to the SCSI standard. This circuitry is well known to the art, and will be understood by those versed in the design of SCSI systems. ACK* is pulled high by a resistor 1000, which is tied to a regulated 2.85 V output provided by a voltage regulator 1002. This is a standard voltage regulator with a power input TPWR, a ground input GND, and a control input NC. As its output, it provides a regulated 2.85 V through a regulated output ROUT. This corresponds to the high level voltage on the SCSI bus.

As its TPWR input, the voltage regulator 1002 receives a standard 5 V signal, which is further buffered to ground through two filtering capacitors 1004. The NC input is tied to ROUT, the GND input is tied to ground. ROUT is buffered to ground through two filtering capacitors 1006.

Thus, ACK* is pulled high, or false, to 2.85 V unless ACK* is pulled low by the SCSI controller 170.

ACK* is provided as an input to two buffers on a buffer chip 1008. A third input of the buffer chip 1008 is tied to ground through a resistor 1010, and the corresponding output of that buffer is tied to the inputs of the remaining buffers to pull those inputs to ground, preventing the corresponding outputs from becoming indeterminate.

The buffer chip 1008 includes two enable inputs ELSB and EMSB, both of which are inverting, and both of which are tied to ground through current limiting resistors 1012, permanently enabling the buffer chip 1008.

The two buffers on the buffer chip 1008 whose inputs are provided by ACK* provide as outputs ACKA* and ACKB*. These in turn are provided through dampening resistors 1014 as ACK0* through ACK6*.

A Micro Linear ML65244 is preferred for use as the fast buffer chip 1008. It is a non-saturating analog buffer, in that it follows its input, and it further has a very low propagation delay of 1.5 nanoseconds. Thus, the slew rates of ACKA* and ACKB*, as well as their amplitudes, become a close approximation of ACK*. This is an important feature because fast slew rates on the SCSI bus can cause signal integrity problems. A small propagation delay is also desirable. Too much delay in ACK* would cause ACKA* and ACKB* to be skewed with respect to data on the SCSI bus.

Finally, the fast buffer chip 1008 can source and sink preferably 100 milliamps into a capacitive load. At the very least, it should source and sink at least greater than the specified SCSI standard of 55 milliamps.

The analog characteristics of this buffer, as well as its low propagation delay, eliminate the signal integrity problem apparently caused by large lump capacitive loads and crosstalk sometimes found in disk drives at the end of a 3' to 12' SCSI cable. This eliminates data errors when the wide SCSI bus is used with such wide SCSI bus devices.

Figure 9:
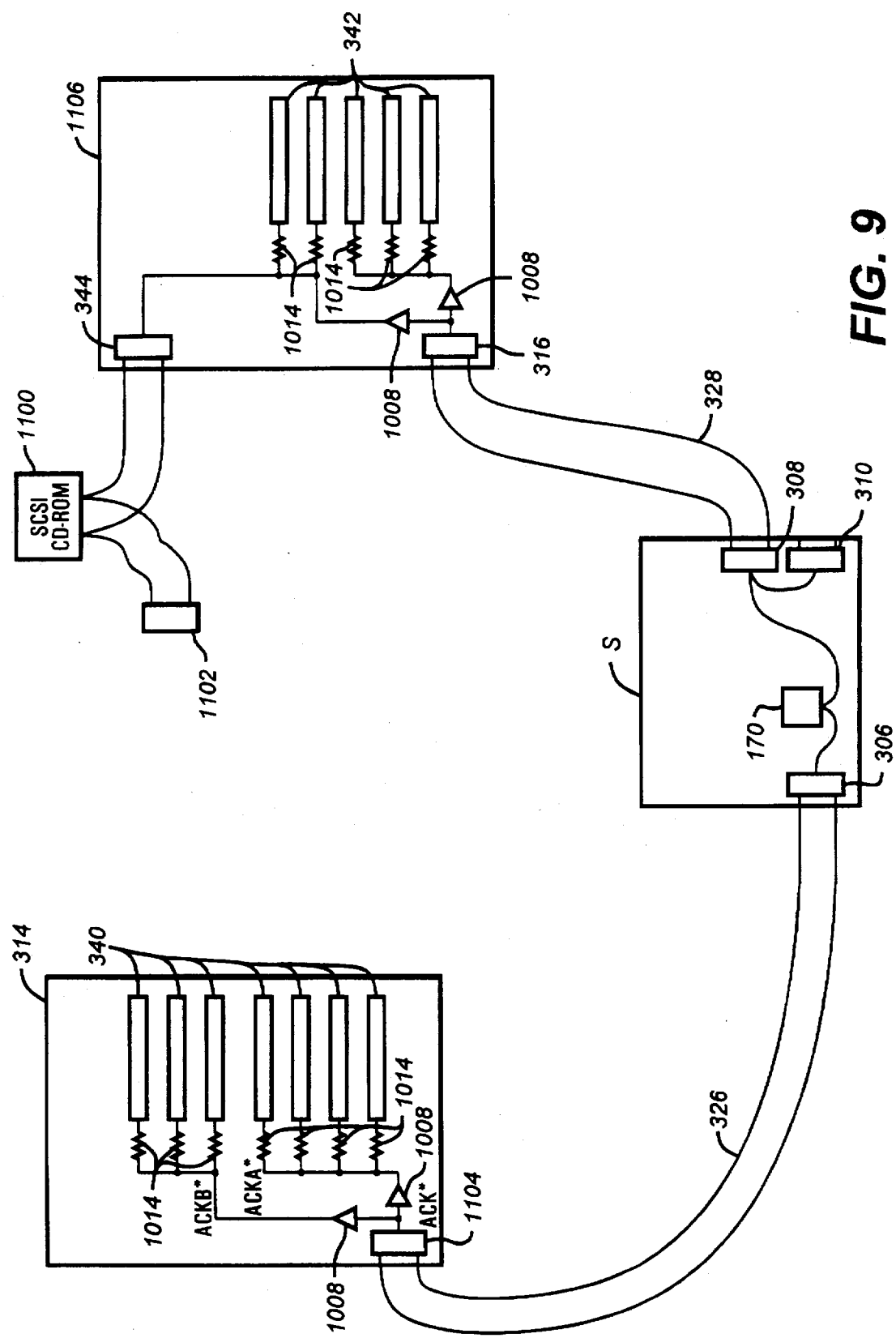
FIG. 9 is a block diagram showing where the circuitry providing the buffered ACK* signal on the SCSI bus according to the invention is preferably located.

Turning to FIG. 9, a block diagram of a typical system in which the buffered ACK* signal would be provided is shown. This block diagram illustrates how the fast buffer chip 1008 is positioned compared to the SCSI cabling, for example compared to the SCSI cables 326 and 328. Turning to FIG. 9, a seven drive SCSI backplane circuit board is the optional SCSI device 314 and is located in a box external to the server that contains the system board S. The SCSI cable 326 connects to the external 16-bit connector 306 on the system board S, and provides the SCSI signals from the SCSI controller 170 to the optional SCSI device 314. Within the device 314 is a connector 1104, from which ACK* is taken to the buffers in the fast buffer chip 1008. From these buffers in the fast buffer chip 1008, ACKA* and ACKB* are provided to the backplane connectors 340 through the dampening resistors 1014.

The SCSI cable 326 will typically be from 3' to 12'. It should be noted that the buffer chip 1008 is placed on the backplane of the optional SCSI device 314 rather than on the system board S. It is important that the fast buffer chip 1008 be close to the connectors 340 for each of the physical devices to be connected rather than upline on the system board S.

When disk drives or other devices are connected internally to the computer system—i.e., within the same box as the system board S—the SCSI cable 328 connects from the internal 16-bit connector 308 (or optionally the internal 8-bit connector 310) to the backplane connector 316. The circuitry is then configured similarly to that on the optional SCSI device 314. A further optional SCSI device 1100, here a SCSI CD ROM, can be further connected to the narrow SCSI header 344, with a terminator 1102 provided on the further optional SCSI device 1100. Again, it should be noted that the fast buffer chip 1008 is on an internal SCSI backplane 1106, rather than on the system board S. In this sense, the fast buffer chip 1008 is in close proximity to the connectors 342 for devices connected on the back of the computer system in the same box as the system board S. If the system board S is within a server, SCSI disk drives would then typically be placed within the same box as the system board S, connected through the connectors 342, which form stubs off the SCSI bus.

The foregoing disclosure and description of the invention are illustrative and explanatory thereof, and various changes in the size, shape, materials, components, circuit elements, wiring connections and contacts, as well as in the details of the illustrated circuitry and construction and method of operation may be made without departing from the spirit of the invention.

I claim:

1. SCSI controller circuitry for controlling a wide SCSI device on a wide SCSI bus such as defined by the SCSI-2 specification working draft revision 10 L, the wide SCSI bus including an ACK* line, comprising:
    circuitry for providing and receiving signals used on the wide SCSI bus, said circuitry providing a SCSI acknowledge signal; and
    a fast buffer with an input and an output, said input receiving said SCSI acknowledge signal from said circuitry, said buffer providing a buffered SCSI ACK* signal to the ACK* line of the wide SCSI bus, and said fast buffer sourcing and sinking more than 55 milliamps into a capacitive load, wherein said fast buffer is of a non-saturating analog design, whereby said buffered SCSI ACK* signal tracks the SCSI acknowledge signal and whereby the slew rate of said buffered SCSI ACK* signal is a close approximation of the slew rate of said SCSI acknowledge signal.

2. The SCSI controller circuitry of claim 1, wherein said fast buffer is a Micro Linear ML 65244 chip.

3. The SCSI controller circuitry of claim 1, wherein said fast buffer has a propagation delay of approximately 1.5 nanoseconds or less.

4. The SCSI controller circuitry of claim 1 further comprising a dampening resistor, and wherein said fast buffer provides said buffered SCSI ACK* signal to the ACK* line through said resistor.

5. The SCSI controller circuitry of claim 4, wherein said resistor has a value of 110 ohms.

6. The SCSI controller circuitry of claim 1 further comprising:
    a regulated 2.85 V supply; and
    a pull-up resistor tied to said regulated 2.85 V supply and to said SCSI acknowledge signal, whereby said SCSI acknowledge signal is pulled to 2.85 V when said SCSI acknowledge signal is left floating by said circuitry.

7. The SCSI controller circuitry of claim 1, wherein said SCSI acknowledge signal is the ACK* signal according to the SCSI-2 standard such as defined by the SCSI-2 specification working draft revision 10 L.

8. SCSI controller circuitry for controlling a wide SCSI device on a wide SCSI bus such as defined by the SCSI-2 specification working draft revision 10 L, the wide SCSI bus including an ACK* line, comprising:

circuitry for providing and receiving signals used on the wide SCSI bus, said circuitry providing a SCSI acknowledge signal; and a fast buffer with an input and an output, said input receiving said SCSI acknowledge signal from said circuitry, said buffer providing a buffered SCSI ACK* signal to the ACK* line of the wide SCSI bus, and said fast buffer being provided at a location physically near the wide SCSI device relative to the length of the SCSI bus.

9. The SCSI controller circuitry of claim 8, wherein said fast buffer is a Micro Linear ML 65244 chip.

10. The SCSI controller circuitry of claim 8, wherein said fast buffer has a propagation delay of approximately 1.5 nanoseconds or less.

11. The SCSI controller circuitry of claim 8, wherein said fast buffer is of a non-saturating analog design, whereby said buffered SCSI ACK* signal tracks the SCSI acknowledge signal and whereby the slew rate of said buffered SCSI ACK* signal is a close approximation of the slew rate of said SCSI acknowledge signal.

12. The SCSI controller circuitry of claim 8 further comprising a dampening resistor, and wherein said fast buffer provides said buffered SCSI ACK* signal to the ACK* line through said resistor.

13. The SCSI controller circuitry of claim 12, wherein said resistor has a value of 110 ohms.

14. The SCSI controller circuitry of claim 8 further comprising:

a regulated 2.85 V supply; and a pull-up resistor tied to said regulated 2.85 V supply and to said SCSI acknowledge signal, whereby said SCSI acknowledge signal is pulled to 2.85 V when said SCSI acknowledge signal is left floating by said circuitry.

15. The SCSI controller circuitry of claim 8, wherein said SCSI acknowledge signal is the ACK* signal according to the SCSI-2 standard such as defined by the SCSI-2 specification working draft revision 10 L.

16. The SCSI controller circuitry of claim 8, wherein said fast buffer sources and sinks more than 55 milliamps into a capacitive load.

17. A system for providing data over a wide SCSI bus such as defined by the SCSI-2 specification working draft revision 10 L, the wide SCSI bus including an ACK* line, the system comprising:

a peripheral mass storage device for providing data, the peripheral mass storage device having a second ACK* line;

a connector for coupling to the wide SCSI bus; and a fast buffer with an input and an output, said input receiving a SCSI acknowledge signal from the ACK* line, said fast buffer providing a buffered SCSI ACK* signal to the second ACK* line of the peripheral mass storage device, and said fast buffer sourcing and sinking more than 55 milliamps into a capacitive load, wherein said fast buffer is of a non-saturating analog design, whereby said buffered SCSI ACK* signal tracks the SCSI acknowledge signal and whereby the slew rate of said buffered SCSI ACK* signal is a close approximation of the slew rate of said SCSI acknowledge signal.

18. The system of claim 17, wherein said fast buffer is a Micro Linear ML 65244 chip.

19. The system of claim 17, wherein said fast buffer has a propagation delay of approximately 1.5 nanoseconds or less.

20. The system of claim 17 further comprising a dampening resistor, and wherein said fast buffer provides said buffered SCSI ACK* signal to the second ACK* line through said resistor.

21. The system of claim 20, wherein said resistor has a value of 110 ohms.

22. The system of claim 17 further comprising:

a regulated 2.85 V supply; and a pull-up resistor tied to said regulated 2.85 V supply and to said SCSI acknowledge signal, whereby said SCSI acknowledge signal is pulled to 2.85 V when said SCSI acknowledge signal is left floating by said circuitry.

23. The system of claim 17, wherein said SCSI acknowledge signal is the ACK* signal according to the SCSI-2 standard such as defined by the SCSI-2 specification working draft revision 10 L.

24. A system for providing data over a wide SCSI bus such as defined by the SCSI-2 specification working draft revision 10 L, the wide SCSI bus including an ACK* line, the system comprising:

a peripheral mass storage device for providing data, the peripheral mass storage device having a second ACK* line;

a connector for coupling to the wide SCSI bus; and a fast buffer with an input and an output, said input receiving a SCSI acknowledge signal from the ACK* line, said fast buffer providing a buffered SCSI ACK* signal to the second ACK* line of the peripheral mass storage device, and said fast buffer being provided at a location physically near the wide SCSI device relative to the length of the SCSI bus.

25. The system of claim 24, wherein said fast buffer is a Micro Linear ML 65244 chip.

26. The system of claim 24, wherein said fast buffer has a propagation delay of approximately 1.5 nanoseconds or less.

27. The system of claim 24, wherein said fast buffer is of a non-saturating analog design, whereby said buffered SCSI ACK* signal tracks the SCSI acknowledge signal and whereby the slew rate of said buffered SCSI ACK* signal is a close approximation of the slew rate of said SCSI acknowledge signal.

28. The system of claim 24 further comprising a dampening resistor, and wherein said fast buffer provides said buffered SCSI ACK* signal to the second ACK* line through said resistor.

29. The system of claim 28, wherein said resistor has a value of 110 ohms.

30. The system of claim 24 further comprising:

a regulated 2.85 V supply; and a pull-up resistor tied to said regulated 2.85 V supply and to said SCSI acknowledge signal, whereby said SCSI acknowledge signal is pulled to 2.85 V when said SCSI acknowledge signal is left floating by said circuitry.

31. The system of claim 24, wherein said SCSI acknowledge signal is the ACK* signal according to the SCSI-2 standard such as defined by the SCSI-2 specification working draft revision 10 L.

32. The system of claim 24, wherein said fast buffer sources and sinks more than 55 milliamps into a capacitive load.

* * * * *